Patented Feb. 26, 1929.

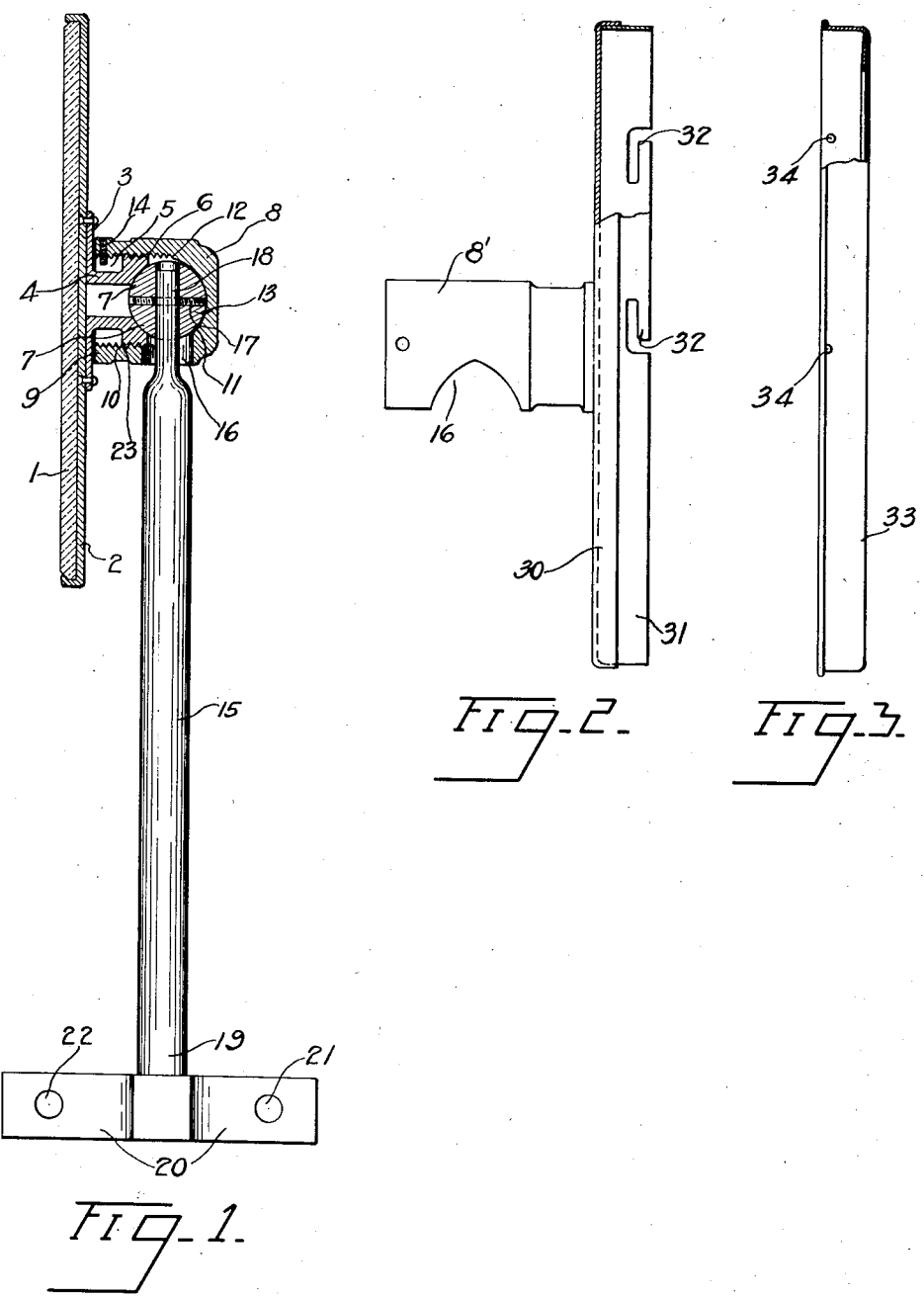

1,703,704

UNITED STATES PATENT OFFICE.

ANNA SYLVIA ANZELL, OF BROOKLYN, NEW YORK.

AUTOMOBILE MIRROR.

Application filed August 11, 1927. Serial No. 212,242.

This invention relates to a mirror construction and more particularly to a readily adjustable mirror adapted to be placed preferably on the windshield frame of automobiles and other vehicles.

Adjustable mirrors as heretofore constructed require the use of tools or considerable force in changing the adjustments from one position to another. When it is desired to change the adjustment of such automobile and other vehicle mirrors it is usually necessary to stop the vehicle and then by involved and considerable manipulation, usually with the aid of tools, the mirror is adjusted to the desired position.

An object of my invention is to provide a mirror that is simple in construction and that can be readily adjusted from one position to another. Another object is to provide adjusting means that can be readily manipulated, without the use of tools so that the adjustment can be accomplished without alighting from the vehicle, when the mirror is positioned so that it can be reached from the interior of the vehicle, as for example, when the mirror is mounted on the windshield frame of an automobile. Still another object is to provide an adjustable structure that is fool proof so that the parts can not be displaced, removed or lost in operation.

According to my invention there is provided a mirror detachably or otherwise secured to a nut member provided with an annular groove and a concave bearing surface, a casing having an interior bearing surface and arranged to threadedly receive the nut member, a spherical member positioned in the casing between the bearing surface in said casing and the concave bearing surface on the nut member, a bracket arm extending through the casing and detachably connected to the spherical member and a pin extending through the casing and into the annular groove whereby the nut member can not be entirely removed from the casing and when the nut member is in position out of engagement with the spherical member the mirror is permitted universal movement about the ball as a pivot so that it may be placed in any desired position and upon rotatable movement of the mirror to cause the concave bearing surface of the nut member to engage the spherical member and confine it between the bearing surface of the nut member and the bearing surface in the casing, the mirror is locked or held in this desired position.

My invention accordingly comprises, a casing, a curved member within said casing and a mirror having means adapted to enter the casing to engage the curved member to hold this curved member in fixed position in the casing.

Other objects and advantages will appear from the following detailed description taken in connection with the accompanying drawing in which Fig. 1 is a vertical end section partly in elevation of a mirror, illustrating a preferred embodiment of my invention, Fig. 2, is an end elevation partly broken away and in section showing a modified form of mirror frame and Fig. 3 is an end elevation broken away and in section showing the fastening means for the mirror used in connection with the frame shown in Fig. 2.

In a preferred embodiment of the invention illustrated on Fig. 1 of the drawing 1 indicates a mirror, detachably or otherwise secured in a frame 2. Fastened to, as by studs 3, or formed integral with the frame 2 is a nut member 4 having a peripheral annular groove 5 and an exteriorly threaded portion 6. The member 4 is provided with a concave bearing portion 7 the function of which will be hereinafter explained.

A casing 8, preferably elongated is provided at the front end 9 with an interiorly threaded bore or opening 10 and a concave bearing portion 11 adjacent the threads 12. A spherical member or ball 13 is placed within the casing in position to contact with the bearing surface 11. The casing 8 is provided with a pin 14 preferably threaded as shown, this pin arranged to extend into the annular groove 5 in nut member 4.

A bracket arm 15 extends through the opening 16 in the side of the casing and is detachably secured to the spherical member 13 by threaded pin 17 extending through the spherical member 13 and the end 18 of the bracket arm. If desired the ball or spherical member 13 may be provided with a threaded opening into which the bracket arm 15 may be threaded. The end 19 of the bracket arm is provided with a flattened extension 20 having openings 21, 22 adapted to receive bolts or other fastening means whereby the mirror may be attached to the automobile or other vehicle.

In assembling, the ball 13 is first positioned within the casing 8 through the threaded opening 10. It will be noted, that the spherical member or ball 13 can not be removed or fall through the circular opening 16 as the diameter of opening 16 is less than that of the ball. The bracket arm is then positioned through the opening 16 and securely fastened to the ball as shown in Fig. 1, by pin 17 or other means. This assembly maintains spherical member 13 within the casing at all times as the unit of bracket arm 15 and ball 13 can not be moved from the casing unless taken apart. The threaded member 4 is then threaded into the threaded opening 10 and the pin 14 is inserted into the side of the casing and extended into the annular groove 5. This construction permits rotary movement of member 4 until the edge 23 abuts against the pin whereupon further movement is prevented by pin 14. Thus there is provided a fool proof assembly which can not fall apart, be lost or taken apart in normal operation.

It will be noted that when member 4 is turned so that the bearing surface 7 does not contact with ball 13, the mirror and casing can be rotated about the ball in any desired direction, there is thus provided universal movement of the mirror about the ball as a pivot. When the mirror is positioned as may be desired, it is then simply rotated causing the bearing surface to engage the ball confining it between bearing surfaces 7 and 11 thus holding the mirror securely in adjusted position. The adjustment is thus readily accomplished by simply slightly turning the mirror in one direction placing the mirror at the desired angle, and then turning it in a reverse direction to cause member 4 to frictionally engage and hold the mirror in the desired position. In practice it has been found that this manipulation can be readily accomplished with one hand, while driving the automobile or other vehicle, if desired.

Although I have illustrated as a preferred embodiment of my invention a spherical or ball member it will be understood that any curved member could be used in lieu of the ball and though I consider a spherical member as a preferred embodiment, my invention is not to be limited to a spherical member within the casing.

In Fig. 1, the mirror is shown secured in frame 2. Instead of this frame a replaceable lens type frame could be used as illustrated in Figs. 2 and 3. The frame 30 is integrally or otherwise formed with casing 8′ and has fastened thereto the cylindrical side 31 provided with bayonet slots 32. The mirror is placed in this frame and then the cap 33 having pins 34 arranged to enter the bayonet slots is positioned on the frame 30 and the mirror is thus held securely in the frame 30.

It will be understood that while a specific embodiment of my invention has been shown and described, various changes in the details thereof may be made by those skilled in the art and the invention is not to be limited to the structure disclosed, but only by the scope of the appended claims.

What is claimed is:

1. In a mirror adapted for use on automobiles, a casing having a threaded interior, a ball within said casing, a member exteriorly threaded and having an annular groove adjacent the threaded portion, said member arranged to threadedly engage the interior of said casing and clamp said ball in said casing to prevent movement of the ball, a pin arranged to extend through the casing into the annular groove and a mirror fastened to said member.

2. In a device of the class described, a casing, having a threaded interior, a ball within said casing, a bracket arm detachably secured to said ball, a member having an annular groove in threaded engagement with the interior of said casing and arranged to frictionally engage said ball, a pin extending through said casing into said groove permitting limited movement of said member and preventing the complete removal of said member from within said casing, and a mirror fastened to said member, whereby rotable movement of said mirror in one direction permits universal movement of said mirror and rotatable movement of said mirror in another direction causes said member to engage said ball and hold the mirror in desired position.

3. A mirror adapted for placement on the windshield frame of an automobile comprising a bracket arm having one end flattened and provided with openings for the reception of fastening means, a casing having a spherical bearing surface, a threaded opening leading from the front of said casing to said bearing surface and an opening on the side of said casing, a ball in said casing adapted to contact with said bearing surface, said bracket arm extending through the opening in the side of the casing and detachably engaging said ball; and an exteriorly threaded nut member having an annular groove and a spherical bearing surface disposed at the inner portion of the threaded end, said threaded end arranged to thread into said casing to engage said ball and confine it between the bearing surface of the casing and the bearing surface on the inner end of said nut member, a pin extending through said casing into said annular groove whereby the nut member can not be entirely removed from said casing without the removal of said pin from said groove, a frame fastened to said nut member and a mirror within said frame.

4. In a mirror adapted for use on automobiles, a casing having a spherical closed bearing portion and a threaded interior side wall portion, a ball within said casing arranged to frictionally engage said spherical closed bearing portion, a bracket arm extending through the side of said casing, secured to said ball, an exteriorly threaded nut member threadedly engaging said threaded interior side wall portion, extending through the front of said casing and provided with a bearing surface for engaging said ball and a mirror secured to said nut member.

In witness whereof, I have hereunto set my hand.

ANNA SYLVIA ANZELL.